(12) United States Patent
Gao et al.

(10) Patent No.: US 10,920,985 B2
(45) Date of Patent: Feb. 16, 2021

(54) FUEL LANCE COOLING FOR A GAS TURBINE WITH SEQUENTIAL COMBUSTION

(71) Applicant: ANSALDO ENERGIA SWITZERLAND AG, Baden (CH)

(72) Inventors: Xianfeng Gao, Niederrohrdorf (CH); Urs Benz, Gipf-Oberfrick (CH); Andre Theuer, Baden (CH); Michael Düsing, Rheinfelden (DE)

(73) Assignee: ANSALDO ENERGIA SWITZERLAND AG, Baden (CH)

( * ) Notice: Subject to any disclaimer, the term of this patent is extended or adjusted under 35 U.S.C. 154(b) by 375 days.

(21) Appl. No.: 14/947,701

(22) Filed: Nov. 20, 2015

(65) Prior Publication Data

US 2016/0146468 A1    May 26, 2016

(30) Foreign Application Priority Data

Nov. 20, 2014  (EP) .................................... 14194098

(51) Int. Cl.
*F23R 3/00*    (2006.01)
*F23R 3/28*    (2006.01)
(Continued)

(52) U.S. Cl.
CPC .............. *F23R 3/283* (2013.01); *F02C 7/222* (2013.01); *F23C 7/002* (2013.01); *F23R 3/12* (2013.01);
(Continued)

(58) Field of Classification Search
CPC .. F23R 3/283; F23R 3/16; F23R 3/286; F23R 3/26; F23R 3/34; F23R 3/346; F23R 3/36;
(Continued)

(56) References Cited

U.S. PATENT DOCUMENTS 3,578,264 A * 5/1971 Kuethe ................... B64C 21/10
                                                    181/220
4,407,632 A * 10/1983 Liang ...................... F01D 5/187
                                                    415/115
(Continued)

FOREIGN PATENT DOCUMENTS

EP    0 677 644 A1    10/1995
EP    1 257 809 B1    11/2002
(Continued)

OTHER PUBLICATIONS

The extended European Search Report dated Apr. 1, 2016, by the European Patent Office in corresponding European Application No. 15193075.7. (7 pages).

(Continued)

*Primary Examiner* — Todd E Manahan
*Assistant Examiner* — Edwin Kang
(74) *Attorney, Agent, or Firm* — Buchanan Ingersoll & Rooney PC

(57) ABSTRACT

A fuel lance is disclosed for injecting a gaseous and/or liquid fuel mixed with air into an axial hot gas flow flowing through a sequential combustor of a gas turbine, the fuel lance having at least one finger extending in a longitudinal direction into the axial hot gas flow of the gas turbine essentially perpendicular to the hot gas flow. The finger is configured as a streamlined body which has a streamlined cross-sectional profile. The body has two lateral surfaces essentially parallel to the axial hot gas flow. The body includes an enclosing outer wall having a longitudinally extending air plenum for the distributed introduction of air into the at least one finger. The air plenum is provided with a plurality of distributed impingement cooling holes, such that air exiting through the impingement cooling holes (Continued)

impinges on the inner side of the leading edge region of the body.

14 Claims, 15 Drawing Sheets

(51) Int. Cl.
*F23C 7/00* (2006.01)
*F23R 3/12* (2006.01)
*F23R 3/18* (2006.01)
*F23R 3/20* (2006.01)
*F23R 3/16* (2006.01)
*F02C 7/22* (2006.01)

(52) U.S. Cl.
CPC .................. *F23R 3/16* (2013.01); *F23R 3/18* (2013.01); *F23R 3/20* (2013.01); *F23R 3/286* (2013.01); *F23R 2900/03044* (2013.01); *F23R 2900/03341* (2013.01); *Y02T 50/60* (2013.01)

(58) Field of Classification Search
CPC .. F23R 2900/03045; F23R 2900/03044; F02C 3/16; F02C 7/18; F02C 7/22; F02C 6/003; F05D 2260/201; F05D 2260/2212; F05D 2260/22141; F02K 3/10
See application file for complete search history.

(56) References Cited

U.S. PATENT DOCUMENTS

| | | | |
|---|---|---|---|
| 4,932,861 A | 6/1990 | Keller et al. | |
| 5,400,589 A * | 3/1995 | Mahias | F01D 9/065 60/262 |
| 5,431,018 A | 7/1995 | Keller | |
| 5,577,889 A | 11/1996 | Terazaki et al. | |
| 5,626,017 A | 5/1997 | Satelmayer | |
| 6,325,593 B1 * | 12/2001 | Darkins, Jr. | F01D 5/186 415/115 |
| 7,104,756 B2 * | 9/2006 | Harding | F01D 5/189 416/233 |
| 7,621,718 B1 | 11/2009 | Liang | |
| 8,864,438 B1 * | 10/2014 | Lee | F01D 5/188 415/1 |
| 2002/0187448 A1 | 12/2002 | Eroglu et al. | |
| 2003/0128364 A1 | 7/2003 | Dickopf et al. | |
| 2005/0111979 A1 | 5/2005 | Liang | |
| 2006/0056967 A1 | 3/2006 | Liang | |
| 2007/0122266 A1 * | 5/2007 | Cairo | F01D 25/12 415/134 |
| 2011/0027102 A1 | 2/2011 | Nakamata et al. | |
| 2011/0136067 A1 * | 6/2011 | Grieb | F23D 11/383 431/182 |
| 2011/0229321 A1 * | 9/2011 | Kilaras | F03D 1/0608 416/1 |
| 2012/0255308 A1 * | 10/2012 | Chandler | F23R 3/002 60/754 |
| 2012/0260622 A1 * | 10/2012 | Poyyapakkam | F23D 14/78 60/39.465 |
| 2012/0285172 A1 * | 11/2012 | Poyyapakkam | F23R 3/14 60/737 |
| 2012/0297777 A1 * | 11/2012 | Poyyapakkam | F23C 5/08 60/737 |
| 2012/0324863 A1 * | 12/2012 | Winkler | F23R 3/20 60/39.463 |
| 2012/0324903 A1 * | 12/2012 | Dewis | F02C 7/143 60/772 |
| 2013/0055722 A1 * | 3/2013 | Verhiel | F23R 3/06 60/772 |
| 2013/0086912 A1 | 4/2013 | Berry | |
| 2014/0033728 A1 | 2/2014 | Marmilic et al. | |
| 2014/0260263 A1 * | 9/2014 | Farrell | F02C 7/22 60/734 |
| 2014/0260282 A1 * | 9/2014 | Pinnick | F23R 3/06 60/754 |
| 2015/0165547 A1 * | 6/2015 | Lin | F23R 3/002 60/752 |

FOREIGN PATENT DOCUMENTS

| | | |
|---|---|---|
| EP | 2 233 693 A1 | 9/2010 |
| EP | 2 522 912 A1 | 11/2012 |
| EP | 2 578 943 A2 | 4/2013 |
| EP | 2 725 301 A1 | 4/2014 |
| EP | 2 725 303 A2 | 4/2014 |
| JP | 2004-138041 A | 5/2004 |
| WO | WO 2011/054739 A2 | 5/2011 |
| WO | WO 2011/054739 A3 | 5/2011 |
| WO | WO 2011/054760 A1 | 5/2011 |
| WO | WO 2011/054766 A2 | 5/2011 |
| WO | WO 2012/136787 A1 | 10/2012 |

OTHER PUBLICATIONS

The Extended European Search Report dated May 19, 2015, issued in corresponding European Patent Application No. 14194098.1—1602. (6 pages).

Chinese Office Action & Search Report dated Nov. 30, 2018 in CN 201510804652.5, and English translation herewith.

* cited by examiner a)

a)	b)

FUEL LANCE COOLING FOR A GAS TURBINE WITH SEQUENTIAL COMBUSTION

BACKGROUND OF THE INVENTION

The present invention relates to the technology of gas turbines with sequential combustion. It refers to a fuel lance cooling according to the preamble of claim 1.

PRIOR ART

In order to achieve a high efficiency, a high turbine inlet temperature is required in standard gas turbines. As a result, there arise high NOx emission levels and high life cycle costs. These problems can be mitigated with a sequential combustion cycle, wherein the compressor delivers nearly double the pressure ratio of a conventional one. The main flow passes the first combustion chamber (e.g. using a burner of the general type as disclosed in EP 1 257 809 or as in U.S. Pat. No. 4,932,861, also called EV combustor, where the EV stands for environmental), wherein a part of the fuel is combusted. After expanding at the high-pressure turbine stage, the remaining fuel is added and combusted (e.g. using a burner of the type as disclosed in U.S. Pat. No. 5,431,018 or 5,626,017 or in US 2002/0187448, also called SEV combustor, where the S stands for sequential). Both combustors contain premixing burners, as low NOx emissions require high mixing quality of the fuel and the oxidizer.

An exemplary gas turbine of the applicant with sequential combustion, which is known as GT26, is shown in FIG. 1.

Gas turbine 10 of FIG. 1 comprises a rotor 11 with a plurality of blades rotating about a machine axis 20 and being surrounded by a casing 12. Air is taken in at air inlet 13 and is compressed by compressor 14. The compressed air is used to burn a first fuel in a first (annular) combustor 15, thereby generating hot gas. The hot gas drives a first, high pressure (HP) turbine 16, is then reheated in a second (annular, sequential) combustor 17, drives a second, low pressure (LP) turbine 18 and exits gas turbine 10 through exhaust gas outlet 19.

Since the second combustor 17 is fed by expanded exhaust gas of the first combustor 15, the operating conditions allow self ignition (spontaneous ignition) of the fuel air mixture without additional energy being supplied to the mixture. To prevent ignition of the fuel air mixture in the mixing region, the residence time therein must not exceed the auto ignition delay time. This criterion ensures flame-free zones inside the burner. This criterion poses challenges in obtaining appropriate distribution of the fuel across the burner exit area. SEV-burners are currently designed for operation on natural gas and oil only. Therefore, the momentum flux of the fuel is adjusted relative to the momentum flux of the main flow so as to penetrate into the vortices. The subsequent mixing of the fuel and the oxidizer at the exit of the mixing zone is just sufficient to allow low NOx emissions (mixing quality) and avoid flashback (residence time), which may be caused by auto ignition of the fuel air mixture in the mixing zone. The cross flow injection concept used in the current SEV-fuel injection devices (SEV fuel lances) necessitates high-pressure carrier air supply, which reduces the overall efficiency of the power plant.

Document WO 2011/054760 A1 discloses a burner for a combustion chamber of a turbine, with an injection device for the introduction of at least one fuel into the burner. The injection device has at least one body arranged in the burner with at least two nozzles for introducing the fuel into the chamber, the body having a streamlined cross-sectional profile extending with a longitudinal direction perpendicularly to a main flow direction prevailing in the burner and two lateral surfaces essentially parallel to the main flow direction joined at their upstream side by a leading edge and joined at their downstream side forming a trailing edge, the nozzles being distributed along said trailing edge. The body comprises an enclosing outer wall defining said streamlined cross-sectional profile, wherein within this outer wall, there is provided a longitudinal inner air plenum for the introduction of air into the injection device. The air plenum is provided with holes such that air exiting through these holes impinges the inner side of the leading edge.

The document is limited to injection devices with external vortex generators. Other means for enhancing fuel/air mixing, especially lobes between the nozzles, are not disclosed.

Furthermore, the document fails to teach geometric details of the impingement cooling, which are essential for a successful operation of such a device.

SUMMARY OF THE INVENTION

It is an object of the present invention to provide impingement cooling details, which are not only applicable to lances with vortex generators, but also to lances with lobes between the fuel nozzles at the trailing edge.

It is another object of the present invention to provide impingement cooling details, which are equally suitable for rectangular burners and annular or center-body burners.

These and other objects are obtained by a fuel lance according to claim 1.

The invention relates to a fuel lance for injecting a gaseous and/or liquid fuel and air into an axial hot gas flow flowing through a sequential combustor of a gas turbine, said fuel lance comprising at least one finger extending in a longitudinal direction into said axial hot gas flow of said gas turbine essentially perpendicular to said hot gas flow;

wherein said at least one finger is configured as a streamlined body which has a streamlined cross-sectional profile;

wherein said body has two lateral surfaces essentially parallel to said axial hot gas flow, joined at their upstream side by a leading edge and joined at their downstream side forming a trailing edge;

wherein a plurality of nozzles for injecting a gaseous and/or liquid fuel and air is distributed along said trailing edge;

wherein means for improving the mixing quality and reducing pressure loss in said sequential combustor are provided in the trailing edge region of said body;

wherein said body comprises an enclosing outer wall defining said streamlined cross-sectional profile, wherein within said outer wall there is provided a longitudinally extending air plenum for the distributed introduction of air into said at least one finger, said air plenum having a distance from said outer wall, defining a first interspace; and wherein said air plenum is provided with a plurality of distributed impingement cooling holes, such that air exiting through said impingement cooling holes impinges on the inner side of the leading edge region of said body.

It is characterized in that said impingement cooling holes each have a hole diameter between 1.2 and 1.8 mm; and said impingement cooling holes are arranged at said air plenum with a pitch ratio, i.e. the ratio of the distance between said holes and the hole diameter, between 3 and 10.

According to an embodiment of the invention within said outer wall there is provided a longitudinally extending gas plenum for the distributed introduction of gaseous fuel into said at least one finger and said gas plenum is arranged in the middle between said leading edge and said trailing edge with a distance from said outer wall, defining a second interspace for the delivery of air from said air plenum to said leading edge.

Specifically, a plurality of distributed pin fins is arranged on the inner side of said outer wall of said streamlined body in the region of said gas plenum for convective cooling of said outer wall by the air flowing from said air plenum to said trailing edge region through said second interspace between said gas plenum and said outer wall; and said pin fins have a height perpendicular to said outer wall of between 1.5 and 2.5 mm, and said pin fins have a pitch ratio of between 3 and 5.

More specifically, said pin fins are cylindrical or tapered or hoof-shaped or have the form of teardrop pins.

Specifically, a plurality of distributed effusion cooling holes is provided in said outer wall at the trailing edge region, through which air from said air plenum exits said streamlined body after having convectively cooled said outer wall in said second interspace.

According to another embodiment of the invention said means for improving the mixing quality and reducing pressure loss in said sequential combustor comprises a plurality of vortex generators arranged on said streamlined body on both sides at the trailing edge region.

According to a further embodiment of the invention said means for improving the mixing quality and reducing pressure loss in said sequential combustor comprises lobes being arranged between said nozzles at the trailing edge of said streamlined body.

According to just another embodiment of the invention said fuel lance is configured for a rectangular burner.

Alternatively, said fuel lance is configured for a center-body burner.

According to another embodiment of the invention the height of the first interspace between said air plenum and said outer wall perpendicular to said outer wall increases from said leading edge towards said trailing edge of said streamlined body in order to reduce cross flow velocity and improve impingement cooling efficiency downstream.

A further improvement for a fuel lance with vortex generators is achieved by each of said vortex generators comprising a leading panel, and providing guiding ribs at said vortex generators in order to guide an air flow closer to said leading panels.

According to a further embodiment of the invention air is feed to said air plenum from both sides of said air plenum, and a flow separator is provided in the longitudinal middle of said air plenum to separate said air flows from both sides in order to avoid instabilities.

According to another embodiment of the invention ribs are provided in lances with a gas plenum at said second interspace between said gas plenum and said outer wall for improving convective cooling in this region.

According to just another embodiment of the invention a bypass is provided in lances with a gas plenum at said air plenum through which bypass air flows from said air plenum into said second interspace independent of said impingement cooling holes.

According to a further embodiment of the invention release holes are provided in a lance with gas plenum in the outer wall at the downstream end of said gas plenum to destroy dead air flow corner behind said gas plenum.

A further improvement for a fuel lance with vortex generators is achieved by having said vortex generators made of a ceramic.

BRIEF DESCRIPTION OF THE DRAWINGS

The present invention is now to be explained more closely by means of different embodiments and with reference to the attached drawings.

DETAILED DESCRIPTION OF DIFFERENT EMBODIMENTS OF THE INVENTION

Figure 1:
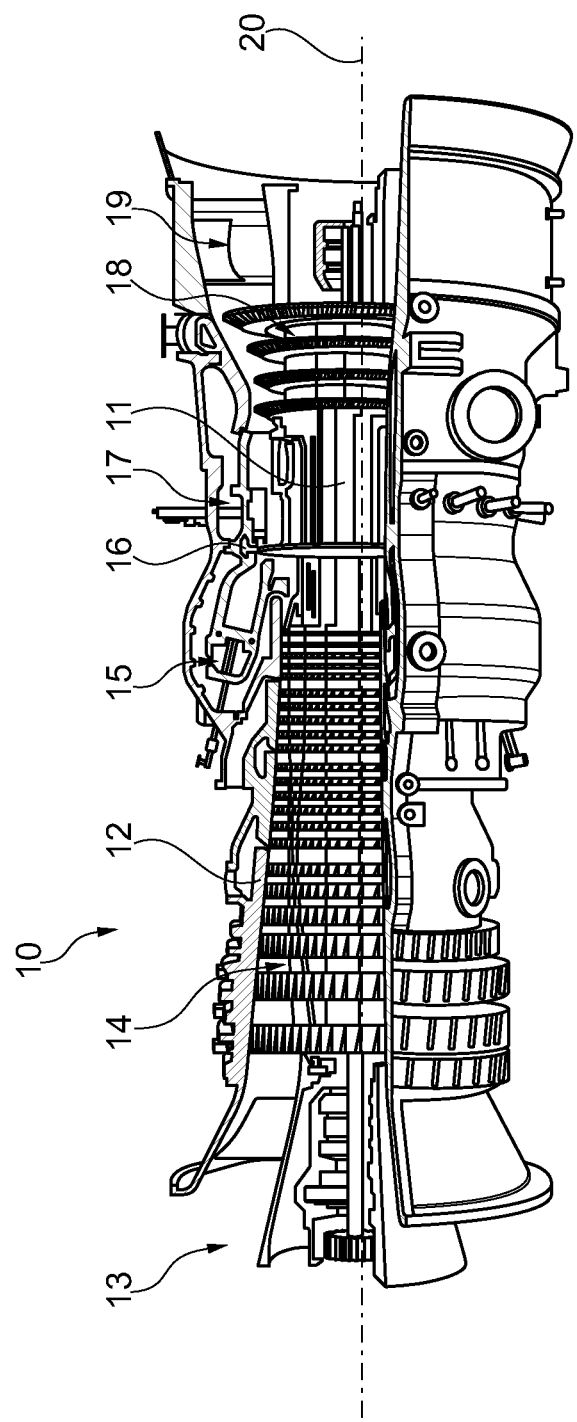
FIG. 1 shows in a perspective view an exemplary gas turbine with sequential combustion of the type GT26.

The constant pressure sequential combustion consists of two combustors (see FIG. 1 of the gas turbine GT26). Implementation of the sequential combustors improves combustion performance and operation flexibility.

However, there are still problems to improve series cooling systems in sequential burners with impingement cooling, convective cooling and effusion cooling for a complicated structure with fuel gas and fuel oil plenum included. It is thus a desire to achieve optimized cooling, good mixing with hot gas flow and a required lifetime with minimal cooling air for lances used in these burners.

A VG lance concept was already developed to improve the mixing quality and reduce the SEV pressure loss and further adapted to a VG lance development for a rectangular burner and for a center-body burner. The same was done for a lobe lance for a rectangular burner and for a center-body burner.

According to the present invention the internal structure and cooling system of these lances are improved as explained below.

Figure 2:
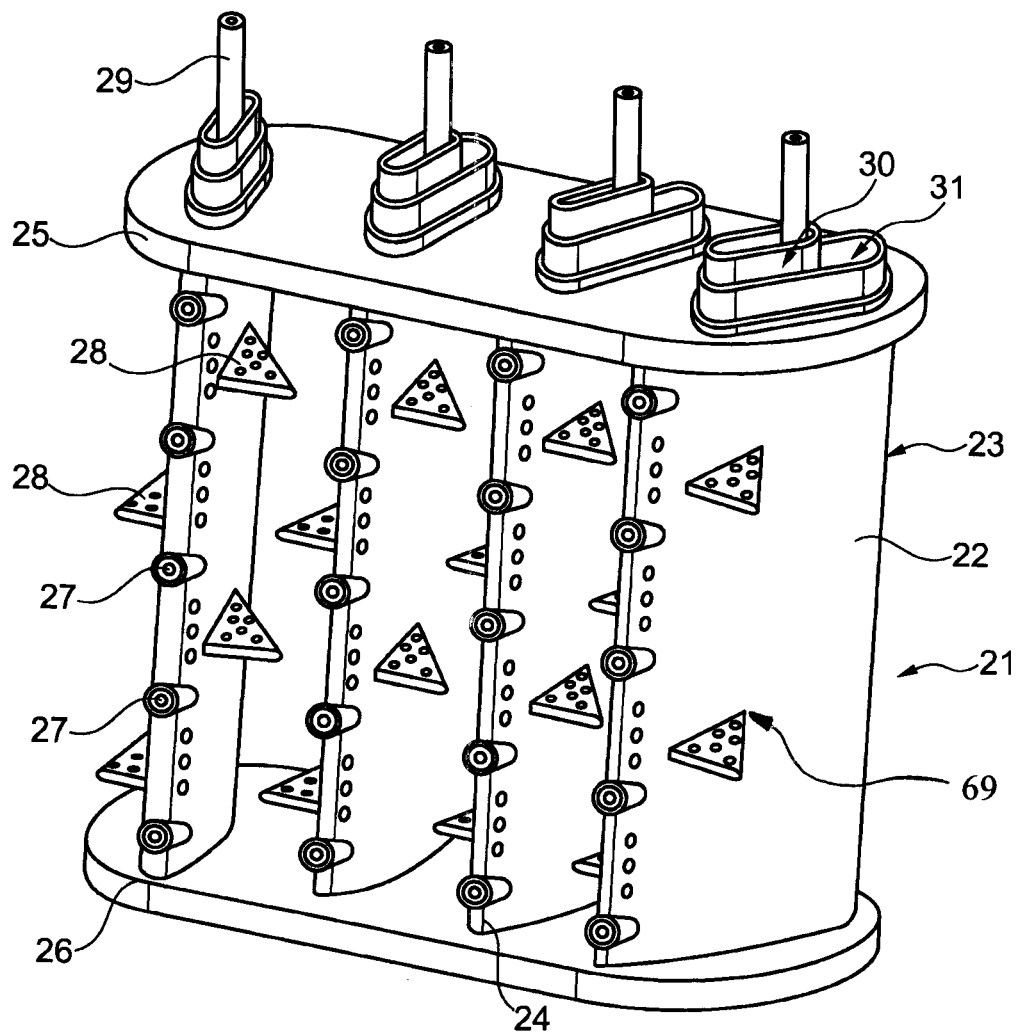
FIG. 2 shows in a perspective view a vortex generator (VG) lance for a rectangular burner according to an embodiment of the invention.
Figure 3:
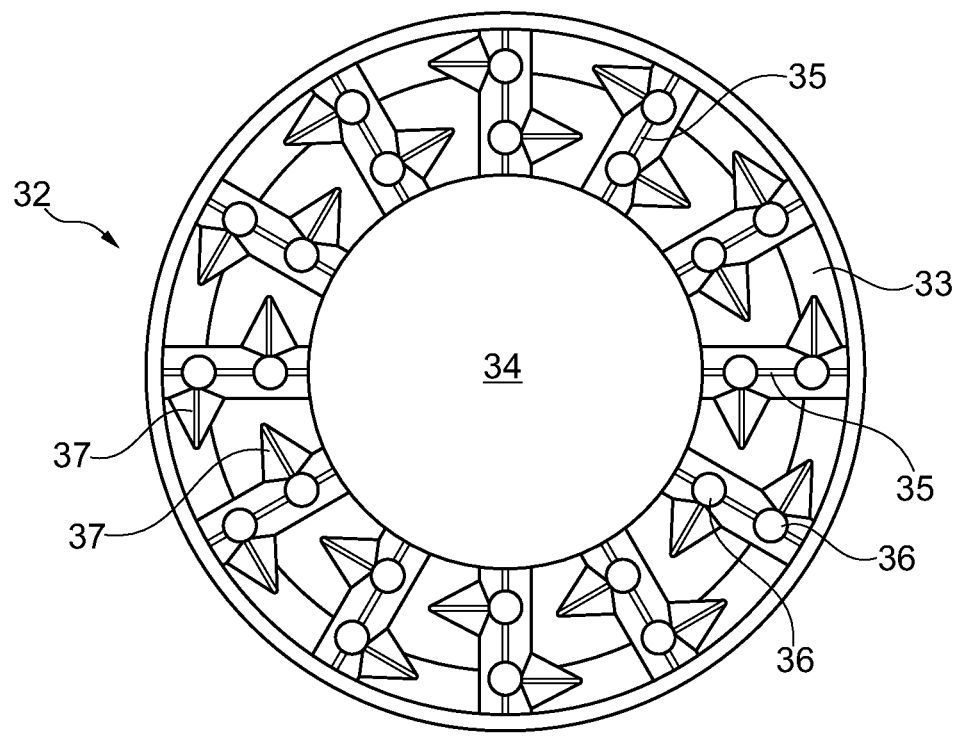
FIG. 3 shows in an axial view a VG lance for a center-body burner according to an embodiment of the invention.

FIG. 2 and FIG. 3 show VG lances 21 and 32 for rectangular burner (FIG. 2) and a center-body burner (FIG. 3). VG lance 21 of FIG. 2 comprises four separate fingers 22 extending in parallel between an upper plate 25 and a lower plate 26. Each finger 22 is configured as a streamlined body which has a streamlined cross-sectional profile (like an airfoil). The body has two lateral surfaces essentially parallel to an axial hot gas flow, which passes through the lance between upper and lower plates 25, 26. The lateral surfaces are joined at their upstream side by a leading edge 23 and joined at their downstream side forming a trailing edge 24.

A plurality of fuel nozzles 27 for injecting a gaseous and/or liquid fuel and air is distributed along the trailing edge 24. Means for improving the mixing quality and reducing pressure loss in said sequential combustor are provided in the trailing edge region of said body in form of a plurality of vortex generators 28 arranged on the streamlined body on both sides at the trailing edge region.

Figure 8:
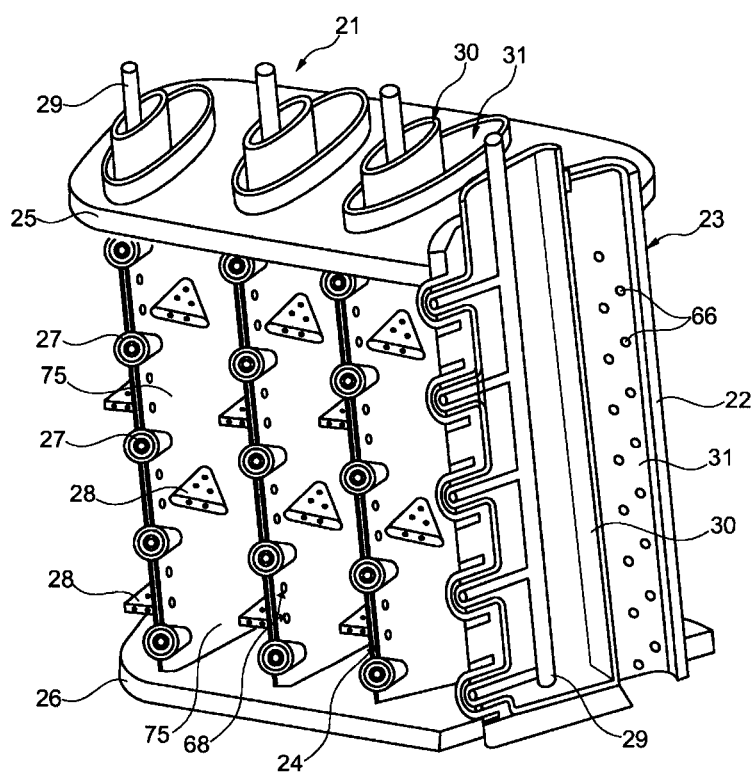
FIG. 8 shows in a perspective view the rectangular VG lance of FIG. 2 with one finger being vertically sectioned.

The streamlined body comprises an enclosing outer wall 75 defining its streamlined cross-sectional profile. Within the outer wall 75 a longitudinally extending air plenum 31 is provided having a distance from outer wall 75, defining a first interspace, for the distributed introduction of air into each finger 22 (see FIG. 8). There is also provided a longitudinally extending gas plenum 30 for the distributed introduction of gaseous fuel into each finger 22. Gas plenum 30 is arranged in the middle between leading edge 23 and trailing edge 24 with a distance from outer wall 75, defining a second interspace for the delivery of air from air plenum 31 to leading edge 23. Liquid fuel (oil) can be introduced by liquid fuel supply 29.

A similar internal structure exists for center-body VG lance 32 of FIG. 3 with its radial fingers 35 extending between an outer ring 33 and a center-body 34, each finger being equipped with nozzles 36 and vortex generators 37.

The cooling air introduced through the air plenum 31 is guided through the lances 21, 32, first cools the leading edge 23 of the VG lances 21, 32 with impingement cooling and reduces heat load with TBC coating (or without TBC coating), and then cools the trailing edge 24 of the VG lances 21, 32 by using convective cooling with internal pins (67 in FIG. 7), and finally is discharged into the hot gas flow through slots between the fuel nozzles 36 and fuel nozzles 27 (as carrier air) and locally discharged to establish effusion cooling.

Figure 4:
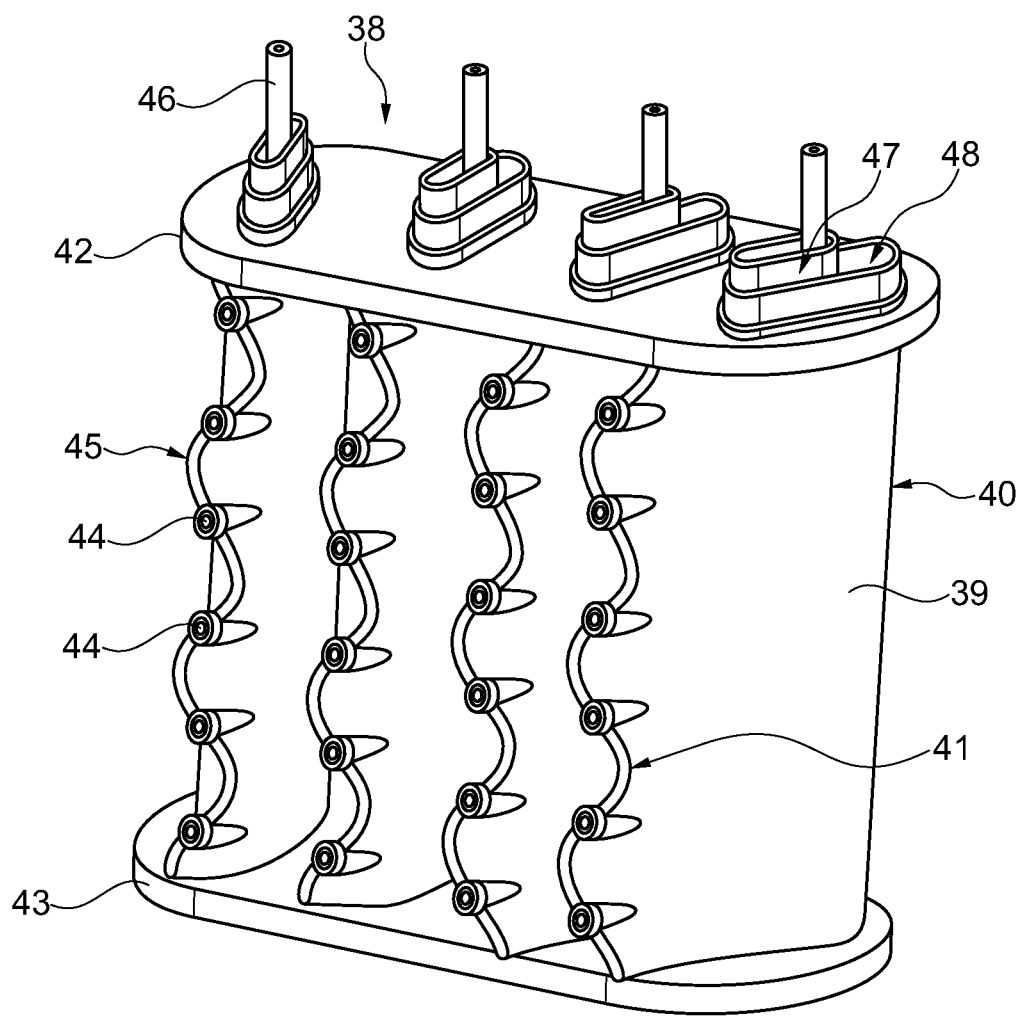
FIG. 4 shows in a perspective view similar to FIG. 2 a lobe lance for a rectangular burner according to an embodiment of the invention.
Figure 5:
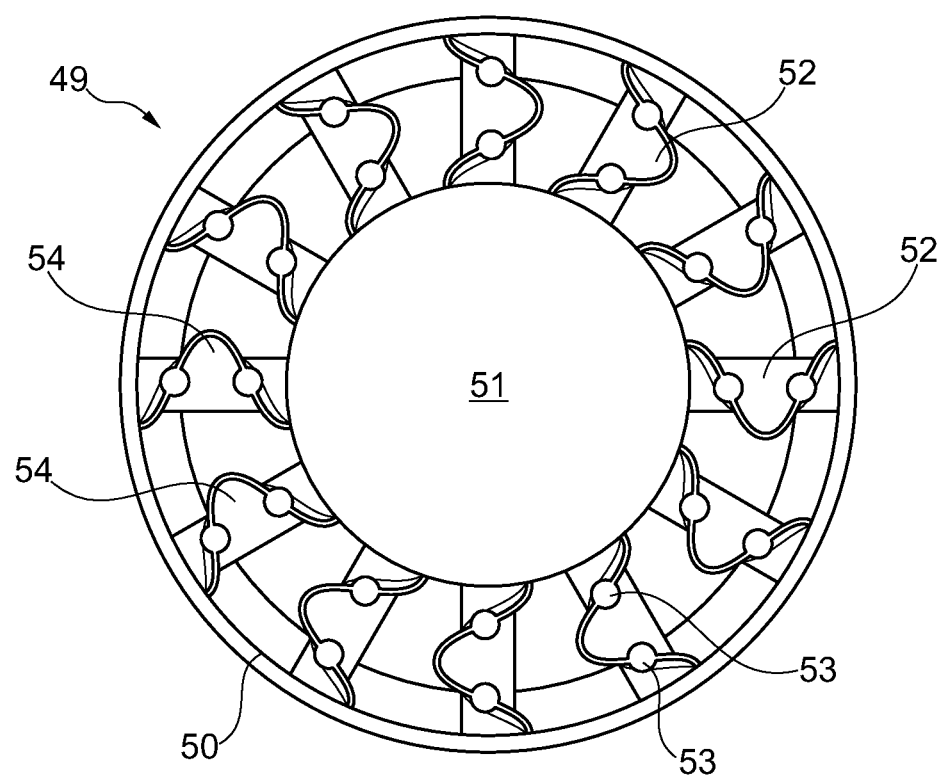
FIG. 5 shows in an axial view similar to FIG. 3 a lobe lance for a center-body burner according to an embodiment of the invention.

A similar situation is given for the lobe lances 38 and 49 of FIG. 4 and FIG. 5 to be used with a rectangular burner (FIG. 4) and a center-body burner (FIG. 5). Lobe lance 38 of FIG. 4 comprises four separate fingers 39 extending in parallel between an upper plate 42 and a lower plate 43. Each finger 39 is configured as a streamlined body which has a streamlined cross-sectional profile (like an airfoil).

The body has two lateral surfaces essentially parallel to an axial hot gas flow, which passes through the lance between upper and lower plates 42, 43. The lateral surfaces are joined at their upstream side by a leading edge 40 and joined at their downstream side forming a trailing edge 41.

A plurality of fuel nozzles 44 for injecting a gaseous and/or liquid fuel and air are distributed along the trailing edge 41. Means for improving the mixing quality and reducing pressure loss in said sequential combustor are provided in the trailing edge region of said body in form of lobes 45 running between the fuel nozzles 44 at the trailing edge 41.

The streamlined body comprises an enclosing outer wall defining its streamlined cross-sectional profile. Within the outer wall a longitudinally extending air plenum 48 is provided having a distance from outer wall, defining a first interspace, for the distributed introduction of air into each finger 39 (see finger 52 in FIGS. 6 and 7).

There is also provided a longitudinally extending gas plenum 47 for the distributed introduction of gaseous fuel into each finger 39. Gas plenum 47 is arranged in the middle between leading edge 40 and trailing edge 41 with a distance from outer wall, defining a second interspace for the delivery of air from air plenum 48 to leading edge 40. Liquid fuel (oil) can be introduced by liquid fuel supply 46.

A similar internal structure exists for center-body lobe lance 49 of FIG. 5 with its radial fingers 52 extending between an outer ring 50 and a center-body 51, each finger being equipped with nozzles 53 and lobes 54 between nozzles 53.

Figure 6:
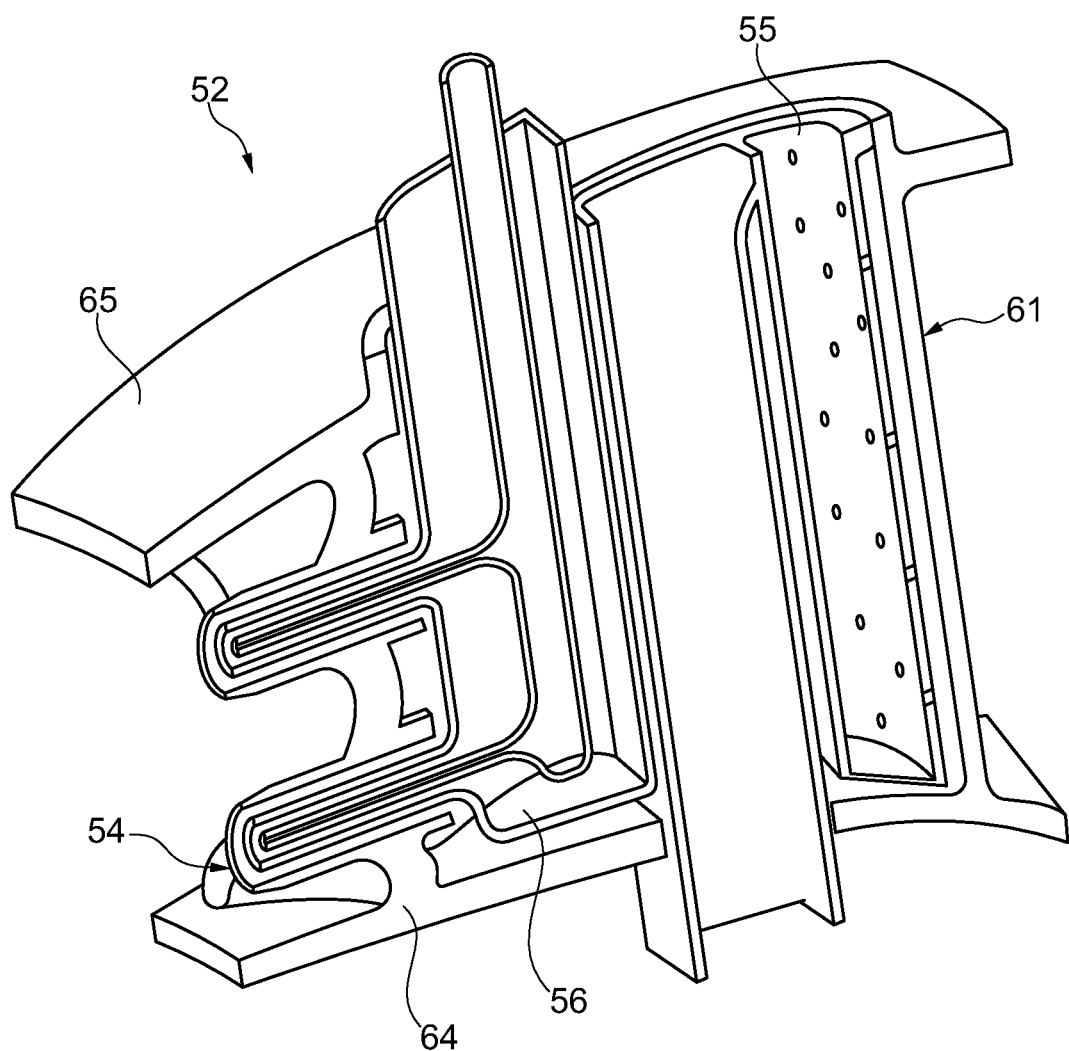
FIG. 6 shows a vertical section through a finger of a center-body lobe lance according to an embodiment of the invention.
Figure 7:
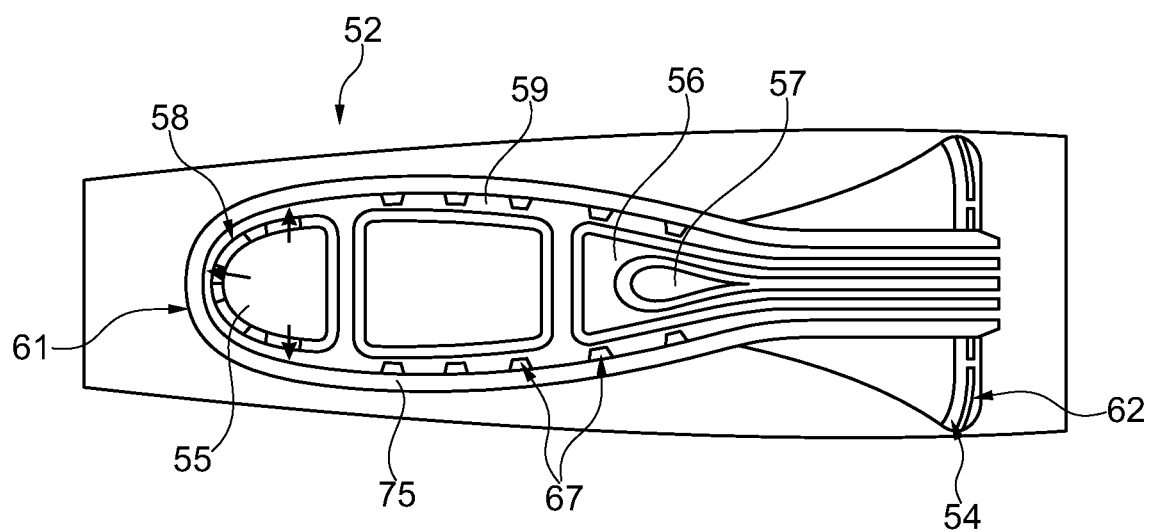
FIG. 7 shows a horizontal section through the finger of FIG. 6.

Details of a lobe lance finger 52 for a center-body burner are shown in FIGS. 6 and 7. Finger 52 extends between an inner plate 64 and an outer plate 65 an comprises an air plenum 55 and a gas plenum 56, which are enclosed by outer wall 75 with leading edge 61 and trailing edge 61.

The cooling air introduced through the air plenum 55 is guided in longitudinal direction through finger 52, first cools the leading edge 61 of the body by means of impingement cooling 58 and reduces heat load with TBC coating (or without TBC coating), and then cools the downstream parts of the body by means of convective cooling 59 with internal pins 67 arranged on the inner side of outer wall 75, and finally is discharged into the hot gas flow through slots between the fuel nozzles 53 and between the fuel nozzles 44 (as carrier air).

Figure 12:
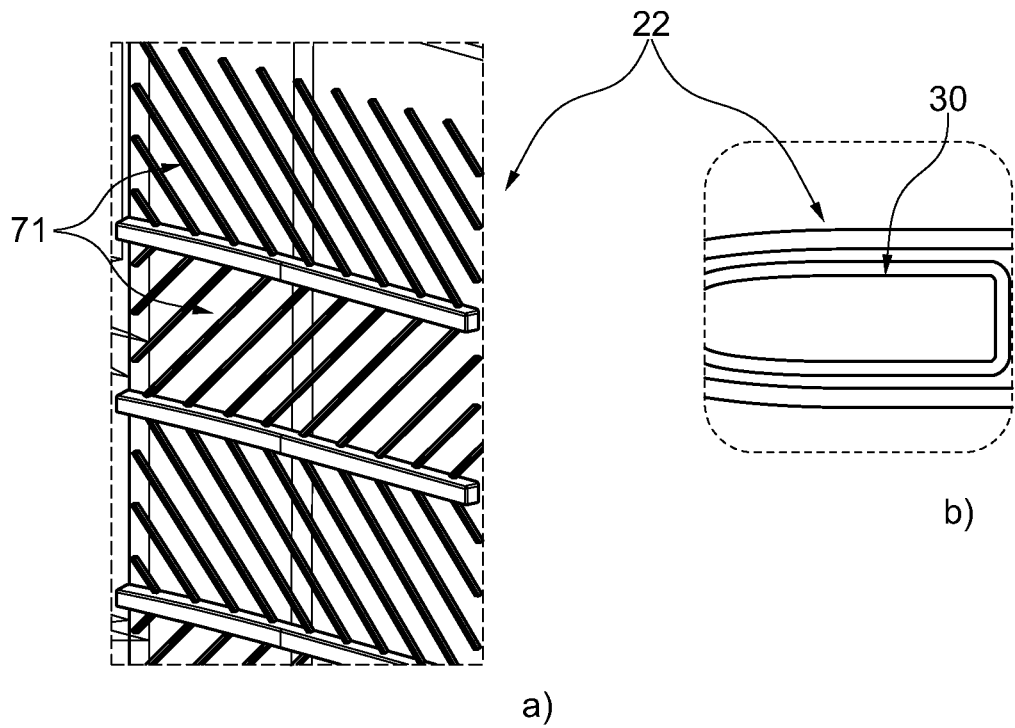
FIG. 12 shows additional oblique ribs for enhanced convection cooling in the gas plenum region of the lance according to another embodiment of the invention.
Figure 13:
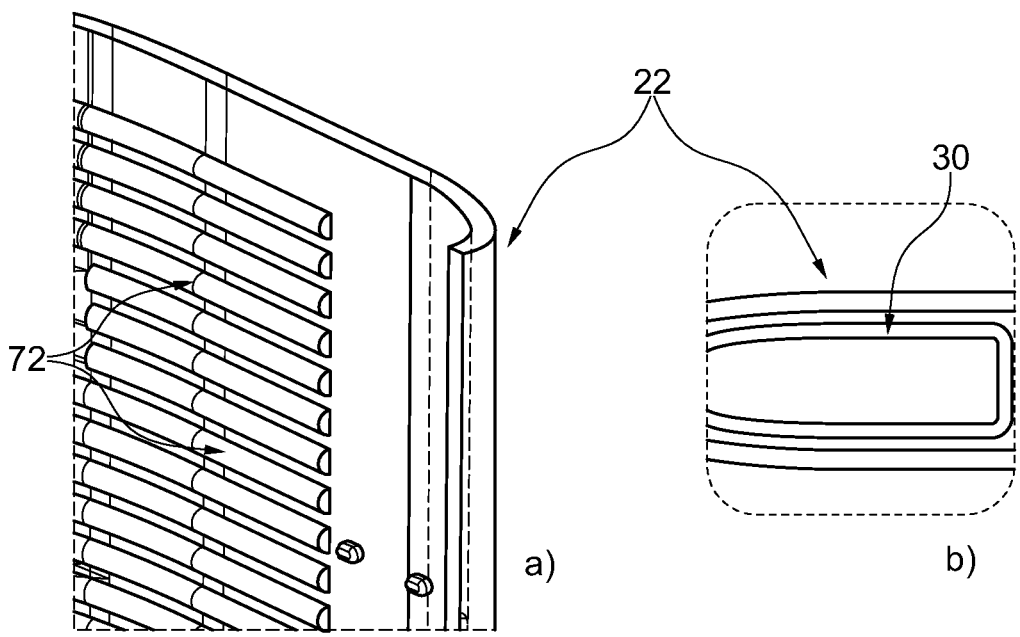
FIG. 13 shows additional lateral ribs for enhanced convection cooling in the gas plenum region of the lance according to another embodiment of the invention.
Figure 14:
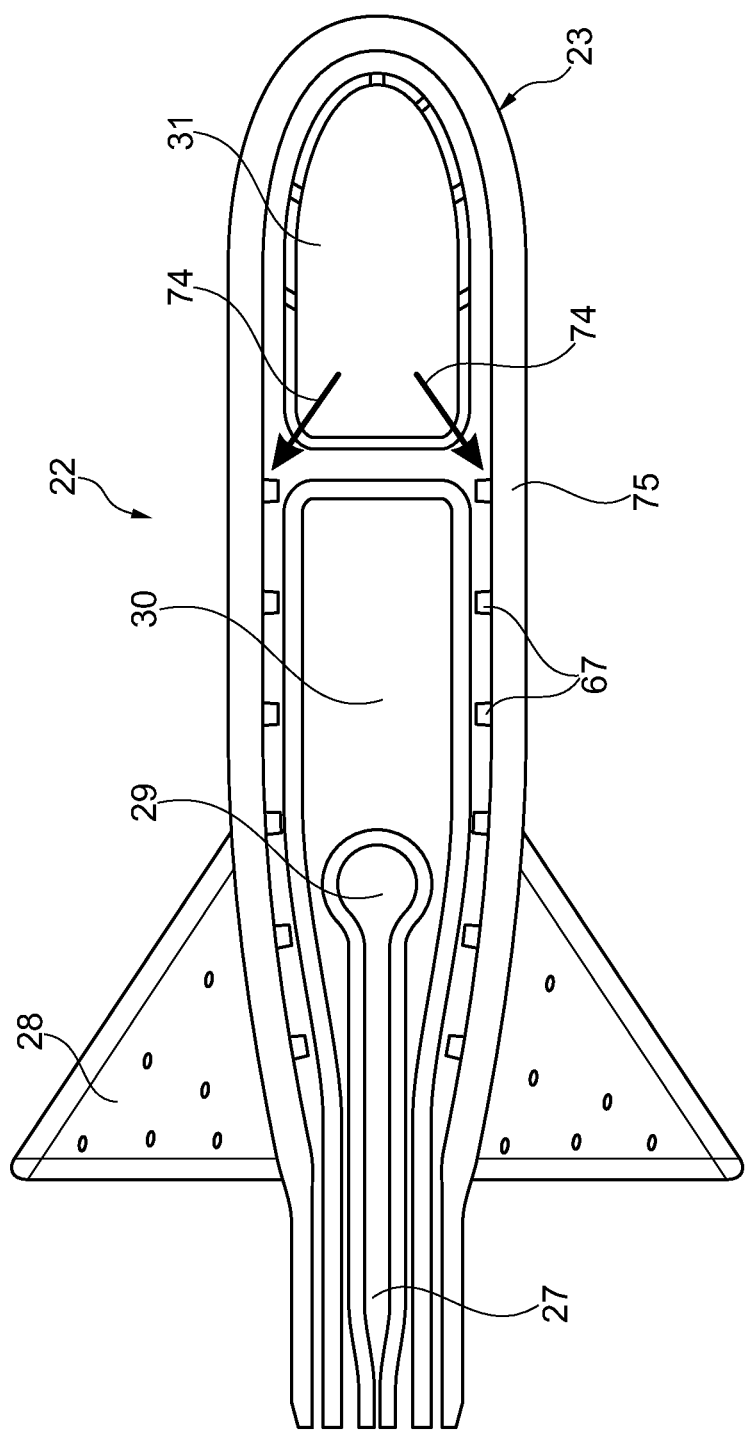
FIG. 14 shows in a horizontal section of a VG lance the possibility of bypassing air from the air plenum according to another embodiment of the invention.

Characteristic features of the new and improved cooling scheme of the VG lances shown in FIG. 2, FIG. 3 and FIG. 8, FIG. 9 are the following:

- A series cooling system for a fuel injection lance (including fuel gas plenum 30 and fuel oil plenum 29).
- Leading edge 23 is impingement cooled with impingement cooling holes 66 (FIG. 9): The impingement cooling hole diameter is in the range 1.2 to 1.8 mm, the pitch ratio (ratio of distance between hoes/hole diameter) is in the range 3 to 10.
- The mid body and trailing edge 24 is convectively cooled with pin fins 67 (FIG. 14): pin fin height is in the range 1.5 to ~2.5 mm, pitch ratio is in the range 3 to 5 (ratio of distance between pin fins/pin fin diameter).
- Pin fins 67 can be cylindrical, tapered, hoof shaped, or tear dropped.
- The region, where the vortex generators 28 are arranged, is effusion cooled. Effusion cooling hole diameter is in the region 0.7 to 1.2 mm, pattern of effusion cooling holes 68 (FIG. 8) has a ratio of distance to hole diameter in the range 4 to 15.
- The cooling flows are finally discharged through slots between fuel nozzles 36, and fuel nozzles 27 (function as carrier air) and the effusion cooling.
- The VG lance cooling can be further improved by:
- The impingement cooling channel height (height of interspace between air plenum 31 and outer wall 75) can vary axially (not necessarily constant height) and especially in downstream direction to optimize the cross cooling flows As shown in FIGS. 12 and 13 vortex generators, straight ribs, V-shaped or W-shaped ribs 71 (FIG. 12) can be applied on the mid body and the trailing edge of the cooling channels to improve the cooling situation there instead of pins Axially directional ribs or flow splitter 72 (FIG. 13) can be applied on mid body and trailing edge to optimize cooling flows Film cooling holes or effusion cooling holes can additionally be applied on some hot spots As shown in FIG. 14, the cooling air can be bypassed as bypass air 74 from air plenum 31 to the mid body without passing through the impingement cooling holes 66. This helps to optimize the cooling between leading edge 23 and trailing edge 24 and optimize the back flow margin which is required by the effusion cooling flows Vortex generators 28 can be replaced with ceramics, and therefore the cooling of vortex generators 28 is not required anymore For the lobe lances shown in FIG. 4, 5 and FIG. 6, 7 the situation is similar:

A series cooling system for a fuel injection lance (including fuel gas plenum 47 and fuel oil plenum 46)

Leading edge 40 is impingement cooled: impingement cooling hole diameter is in rage 1.2 to 1.8 mm, pitch ratio (ratio of distance between holes/hole diameter) is in range 3 to 10

The mid body and trailing edge 41 is convectively cooled with pin fins 67: pin fin height is in range 1.5 to 2.5 mm, pitch ratio is in range 3 to 5 (ratio of distance between pin fins/pin fin diameter)

Pin fins 67 can be cylindrical, tapered, hoof shaped, or tear dropped

The cooling flows are finally discharged through slot between fuel nozzles 53, and between fuel nozzles 44 (function as carrier air) and locally effusion cooling if needed for hot spot.

Figure 9:
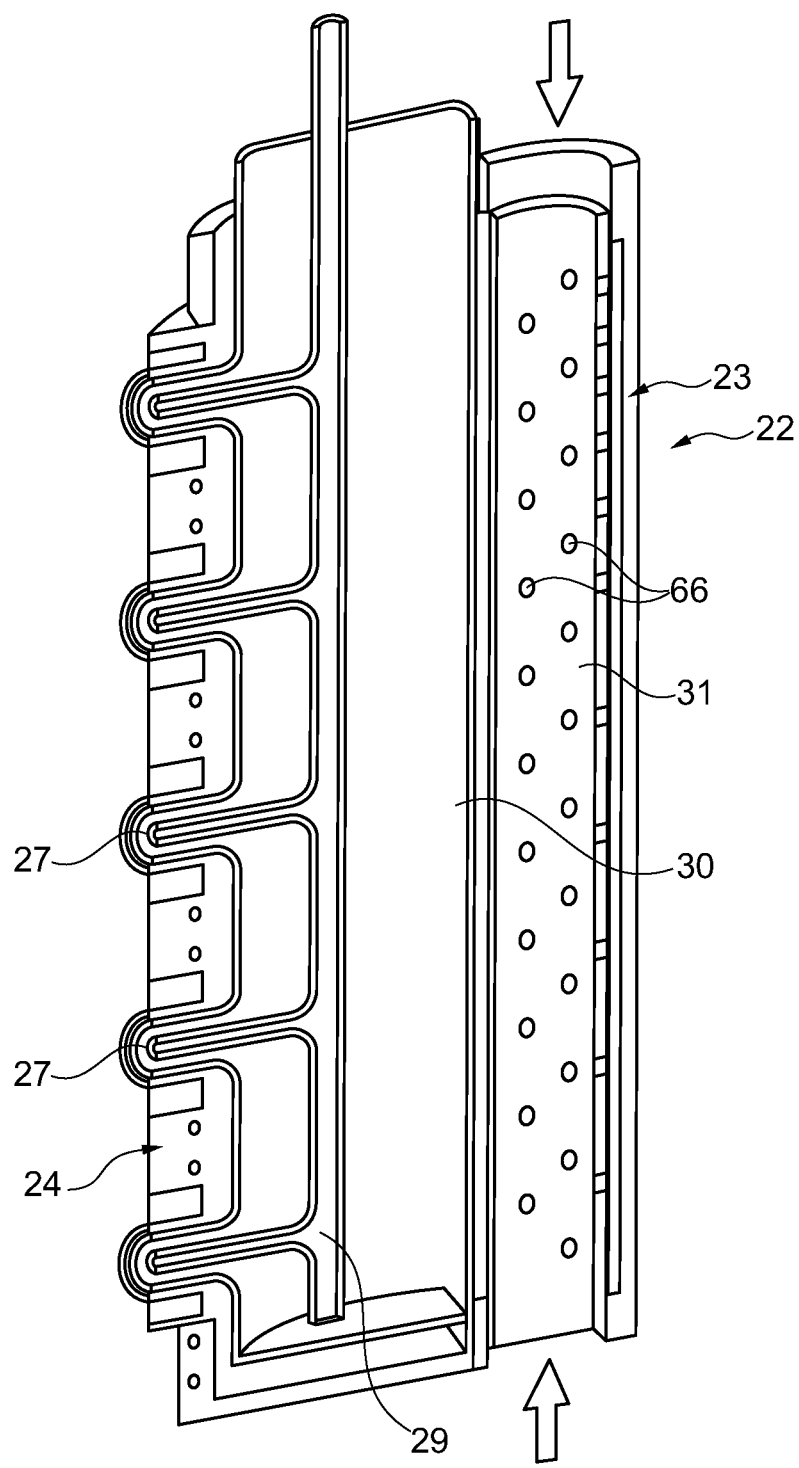
FIG. 9 shows in detail the sectioned finger of FIG. 8.
Figure 10:
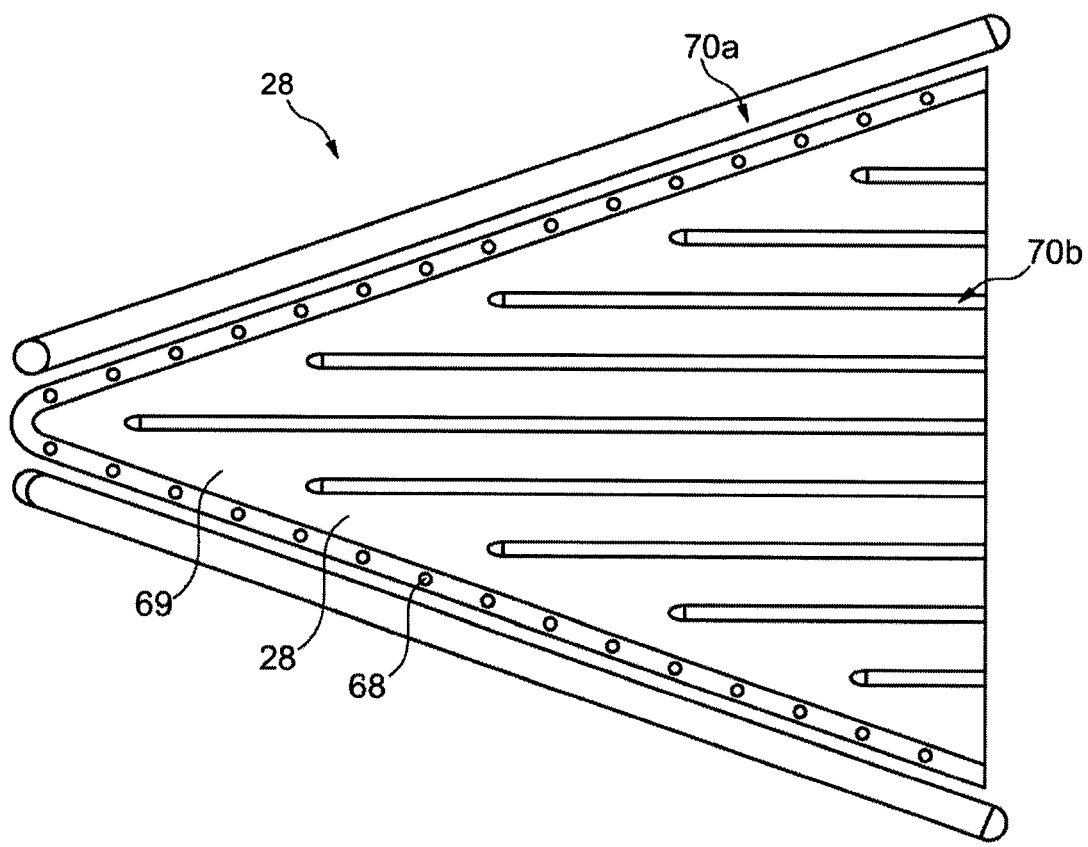
FIG. 10 shows a detail of a vortex generator of the VG lance with additional ribs according to another embodiment of the invention.
Figure 11A:
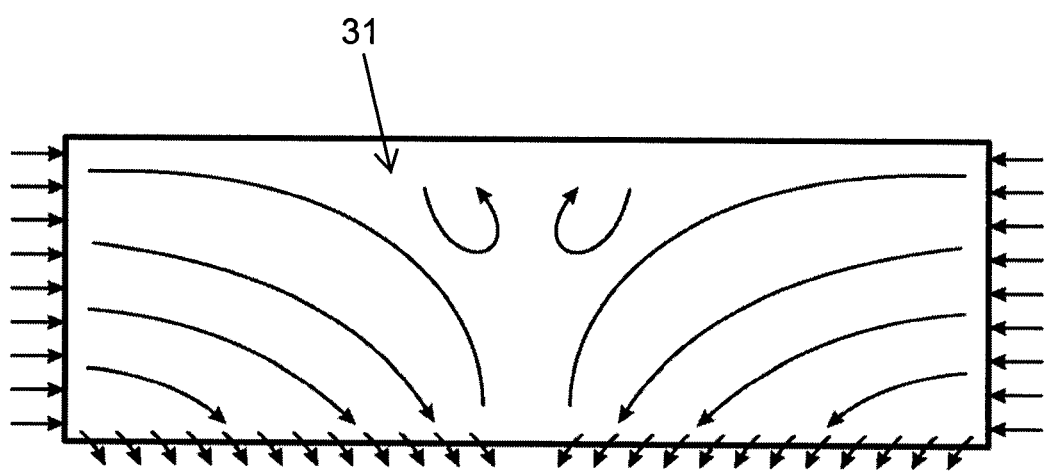
FIG. 11a, FIG. 11b show the possibility of feeding air to the air plenum from both sides (FIG. 11a) and separating the flows be means of a flow separator according to another embodiment of the invention (FIG. 11b)
Figure 11B:
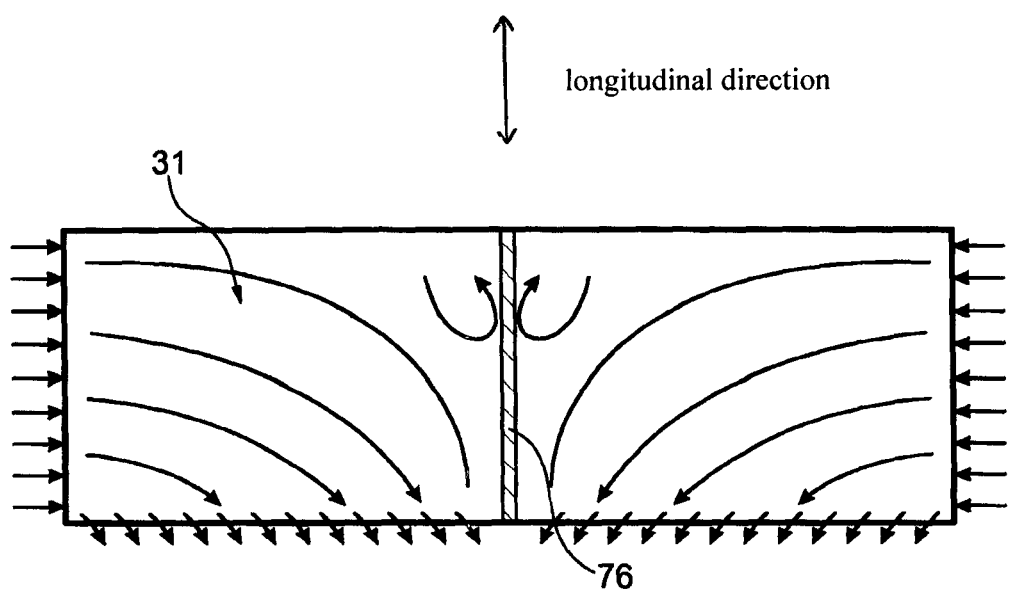
Figure 15:
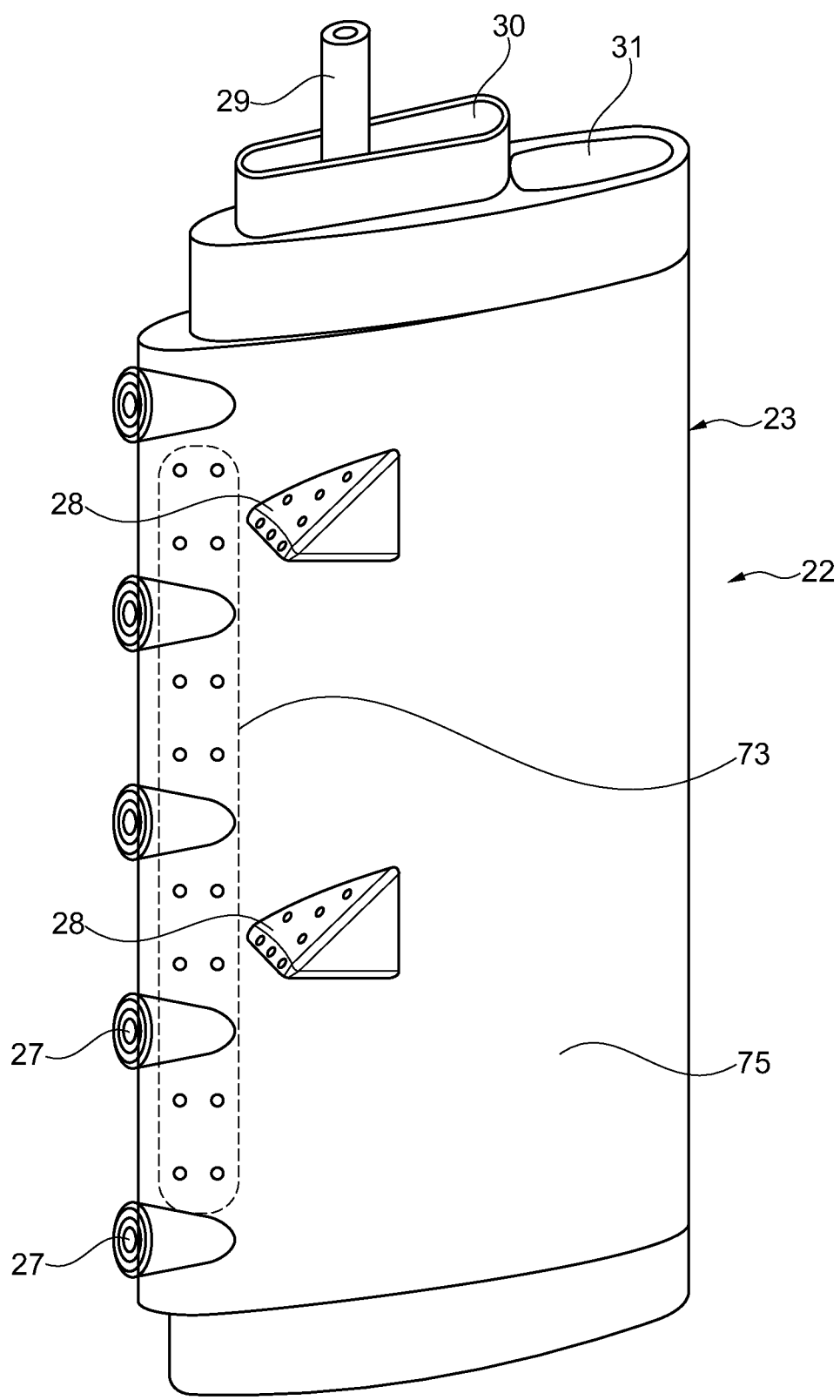
FIG. 15 shows the provision of additional release holes at the downstream corner of the gas plenum according to another embodiment of the invention.

The lobe lance cooling can be further improved:

The impingement cooling channel height can vary axially (not necessarily constant height), especially increase in downstream direction, to optimize the cross cooling flows Vortex generators, Straight ribs, V shaped or W shaped ribs (71 in FIG. 12) can be applied on the mid body and the trailing edge 41 of the cooling channels to improve the cooling situation there instead of pins Axially directional ribs or flow splitters (72 in FIG. 13) can be applied on mid body and trailing edge 41 to optimize cooling flows Film cooling holes or effusion cooling holes can be applied on some hot spots As shown in FIG. 14, the cooling air can be bypassed as bypass air 74 from air plenum 48 to the mid body without passing through the impingement cooling holes 66. This helps to optimize the cooling between leading edge 40 and trailing edge 41 and optimize the back flow margin which is required by the effusion cooling flows Other possible improvements are the following:

As shown in FIG. 10, guiding ribs 70a, 70b may be provided at each vortex generator 28 to guide air flow closer to the leading panel 69 of vortex generator 28, as the leading panel can not be well cooled due to very low hot gas back flow margin (BfM) without such guiding ribs 70a, 70b As shown in FIG. 11, the air plenum 31 is fed with air form both ends (see also FIG. 9). As collision of two counter air flows can cause an instability, a flow separator 76 may be provided at the longitudinal middle of the air plenum to avoid these counterflows As shown in FIG. 15, additional release holes 73 are provided between vortex generators 28 and nozzles 27 to destroy the dead air flow corner behind the fuel gas plenum 30 and increase the cooling velocity of this area for better cooling; these release holes 73 work as film cooling holes as well

LIST OF REFERENCE NUMERALS 10 gas turbine (GT, e.g. GT26)
11 rotor
12 casing
13 air inlet
14 compressor
15 combustor (annular, e.g. EV)
16 high pressure (HT) turbine
17 combustor (annular, sequential, e.g. SEV)
18 low pressure (LP) turbine
19 exhaust gas outlet
20 machine axis
21 lance (vortex generator VG; rectangular burner)
22,39 finger
23,40 leading edge
24,41 trailing edge
25,42 upper plate
26,43 lower plate
27,44 nozzle
28,37 vortex generator (VG)
29,46 liquid fuel supply (fuel oil plenum)
30,47,56 gas plenum
31,48,55 air plenum
32 lance (VG; center-body burner)
33,50 outer ring
34,51 center-body
35,52 finger
36,53 nozzle
38 lance (lobe)
45,54 lobe
49 lance (lobe; center-body burner)
57 liquid fuel supply
58 impingement cooling
59 convective cooling
60 effusion cooling
61 leading edge
62 trailing edge
64 inner plate
65 outer plate
66 impingement cooling hole
67 pin fin
68 effusion cooling hole
69 leading panel (VG)
70a, 70b guiding rib
71,72 rib
73 release hole
74 bypass air
75 outer wall
76 flow separator

The invention claimed is:
1. A fuel lance for injecting a gaseous and/or a liquid fuel and air into an axial hot gas flow flowing through a sequential combustor of a gas turbine, said fuel lance comprising:

at least one finger extending into said axial hot gas flow in a longitudinal direction that is perpendicular to said axial hot gas flow, wherein said at least one finger is configured as a streamlined body which has a streamlined cross-sectional profile, wherein said streamlined body has two lateral surfaces arranged to be parallel to said axial hot gas flow, joined at their upstream side by a leading edge and joined at their downstream side forming a trailing edge, wherein a plurality of nozzles are distributed along said trailing edge, wherein means for impacting a mixing quality and reducing pressure loss in said sequential combustor are provided at a region around the trailing edge of said streamlined body, wherein said streamlined body includes an enclosing outer wall defining said streamlined cross-sectional profile, wherein within said enclosing outer wall there is provided a longitudinally extending air plenum for a distributed introduction of the air into said at least one finger, said longitudinally extending air plenum having a first distance from said enclosing outer wall, defining a first interspace, wherein said longitudinally extending air plenum is provided with a plurality of distributed impingement cooling holes, such that the air exiting through said plurality of distributed impingement cooling holes impinges on an inner side of the enclosing outer wall at a region around the leading edge of said streamlined body, wherein the air is mixed with the gaseous and/or the liquid fuel after exiting through the plurality of distributed impingement cooling holes, wherein said plurality of distributed impingement cooling holes each have a hole diameter between 1.2 mm and 1.8 mm, and said plurality of distributed impingement cooling holes are arranged at said longitudinally extending air plenum with a first pitch ratio, the first pitch ratio being a distance between two holes of said plurality of distributed impingement cooling holes and the hole diameter of any one of the two holes and being between 3 and 10, wherein a height of the first interspace between said longitudinally extending air plenum and said enclosing outer wall perpendicular to said enclosing outer wall increases beginning from said leading edge towards said trailing edge of said streamlined body, wherein within said enclosing outer wall there is provided a longitudinally extending gas plenum for a distributed introduction of the gaseous fuel into said at least one finger, said longitudinally extending gas plenum being arranged in a middle between said leading edge and said trailing edge with a second distance from said enclosing outer wall, defining a second interspace, wherein a plurality of distributed pin fins are arranged on the inner side of said enclosing outer wall of said streamlined body at a region around said longitudinally extending gas plenum for convective cooling of said enclosing outer wall by the air flowing from said longitudinally extending air plenum to said region around the trailing edge through said second interspace between said longitudinally extending gas plenum and said enclosing outer wall, wherein the plurality of distributed pin fins are entirely downstream of said first interspace with respect to the air flowing from said longitudinally extending air plenum to said region around the trailing edge.

2. The fuel lance according to claim 1, wherein said plurality of distributed pin fins have a height perpendicular to said enclosing outer wall between 1.5 mm and 2.5 mm, and said plurality of distributed pin fins have a second pitch ratio, the second pitch ratio being a ratio of distance between two pin fins of the plurality of distributed pin fins and a diameter of one of the two pin fins, and being between 3 and 5.

3. The fuel lance according to claim 2, wherein said plurality of distributed pin fins are cylindrical or tapered or hoof-shaped or teardrop shaped.

4. The fuel lance according to claim 2, wherein a plurality of distributed effusion cooling holes are provided in said enclosing outer wall at the region around the trailing edge, through which the air from said longitudinally extending air plenum exits said streamlined body after having convectively cooled said enclosing outer wall in said second interspace.

5. The fuel lance according to claim 1, wherein said means for impacting the mixing quality and reducing the pressure loss in said sequential combustor comprises:
a plurality of vortex generators arranged on said streamlined body on both sides at the region around the trailing edge.

6. Fuel lance according to claim 1, wherein said means for impacting the mixing quality and reducing the pressure loss in said sequential combustor comprises: lobes being arranged between said nozzles at the trailing edge of said streamlined body.

7. The fuel lance according to claim 1, wherein said fuel lance is configured for a rectangular burner.

8. Fuel lance according to claim 1, wherein said fuel lance is configured for a center-body burner.

9. The fuel lance according to claim 1, wherein increasing the height of the first interspace allows a reduction of cross flow velocity and an enhancement of impingement cooling efficiency downstream.

10. The fuel lance according to claim 5, wherein each vortex generator of said plurality of vortex generators comprises:
a leading panel, and guiding ribs to guide an air flow closer to said leading panel.

11. The fuel lance according to claim 10, comprising: a flow separator in a longitudinal middle of said longitudinally extending air plenum to separate said air flowing from both ends of the longitudinally extending air plenum and to avoid instabilities.

12. The fuel lance according to claim 1, wherein a bypass is provided at said longitudinally extending air plenum through which bypass air flows from said longitudinally extending air plenum into said second interspace.

13. The fuel lance according to claim 1, wherein release holes are provided in the enclosing outer wall at a downstream end of said longitudinally extending gas plenum to avoid a dead air flow corner behind said longitudinally extending gas plenum.

14. The fuel lance according to claim 5, wherein said vortex generators are made of a ceramic.

* * * * *